United States Patent

Trumbo et al.

Patent Number: 6,090,882
Date of Patent: *Jul. 18, 2000

[54] CROSSLINKABLE SURFACE COATINGS AND PROCESS OF PREPARATION

[75] Inventors: David L. Trumbo; Paul E. Gloor, both of Racine, Wis.

[73] Assignee: S. C. Johnson Commercial Markets, Inc., Sturtevant, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,217

[22] Filed: May 30, 1997

[51] Int. Cl.$^7$ ...................................................... C08L 39/00
[52] U.S. Cl. ............................................. 524/555; 523/201
[58] Field of Search .................................... 524/500, 555, 524/558

[56] References Cited

U.S. PATENT DOCUMENTS

| | | | |
|---|---|---|---|
| 5,270,380 | 12/1993 | Adamson | 524/556 |
| 5,362,816 | 11/1994 | Snyder | 525/329.9 |
| 5,484,849 | 1/1996 | Bors | 524/513 |
| 5,498,659 | 3/1996 | Esser | 524/551 |
| 5,534,310 | 7/1996 | Rokowski | 427/494 |
| 5,605,952 | 2/1997 | Esser | 524/522 |

FOREIGN PATENT DOCUMENTS

| | | |
|---|---|---|
| 0 764 699 A2 | 3/1997 | European Pat. Off. . |
| 0 854 153 | 7/1998 | European Pat. Off. . |

*Primary Examiner*—Paul R. Michl
*Attorney, Agent, or Firm*—Renee J. Rymarz; Neil E. Hamilton

[57] ABSTRACT

A novel single package aqueous polymeric formulation containing a polymeric ingredient having a latex seed core and both carboxylic acid functional pendant moieties and a monomer having pendant moieties having the ability to form stable enamine structures by reaction with amines which contain a divalent group of the structure

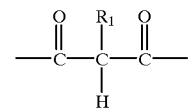

wherein $R_1$ is either H, a $C_1$ to $C_{10}$ alkyl group, or phenyl, is disclosed. Also disclosed is a process for preparing the aqueous polymeric formulation.

53 Claims, No Drawings

CROSSLINKABLE SURFACE COATINGS AND PROCESS OF PREPARATION

BACKGROUND OF THE INVENTION

1. Field of the Invention

This invention is related to a single-package aqueous polymeric formulation that contains a polymeric ingredient having a latex seed core and both acid functional and pendant moieties having the ability to form stable enamine structures by reaction with amines, e.g., acetoacetoxy functional pendant moieties. The invention is also directed to a process for preparing such aqueous polymeric formulations. The formulations of this invention are highly useful in protective coating compositions having ambient cure capability, e.g. wood, metal and concrete coatings.

2. Related Background Art

Ethylenically-unsaturated monomers containing active methylene groups such as

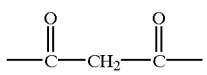

and polymers prepared from such monomers having pendant active methylene groups have long been known. For example, U.S. Pat. No. 3,459,708 discloses acetoacetates, such as 2-acetoacetoxyethyl methacrylate and 2-acetoacetoxyethyl acrylate, for forming polymers to be used as gelatin extenders or substitutes in photographic films.

The preparation of various acetoacetates and acetoacetamides is well known. For example, S. J. Witzeman, et al., The Journal of Organic Chemistry, 56, 1713–18 (1991) discloses the preparation of acetoacetates and acetoacetamides by reaction of various nucleophiles with tert-butyl acetoacetates. This reference reports that acetoacetylated materials may be used as chemical intermediates in the pharmaceutical, agrichemical, chemical and polymer industries.

More particularly, it is known to use acetoacetoxy-functional moiety-containing polymers in combination with polyfunctional amines in latex compositions. Such compositions may be applied to substrates to form films by crosslinking the amines with the acetoacetoxy-functional moiety through the formation of enamine linkages. For example, U.S. Pat. No. 5,498,659 discloses a particularly advantageous storage-stable single-package latex formulation containing a polymeric ingredient having at least pendant moieties having the ability to form stable enamine structures by reaction with amines, e.g., acetoacetoxy functional pendant moieties. This reference discloses that preferred acetoacetoxy functional moiety-containing ingredients include acetoacetamide methacrylate and acetoacetamide acrylate, acetoacetoxyethyl methacrylate ("AAEM"), acetoacetoxyethyl acrylate ("AAEA"), allyl acetoacetate and vinyl acetoacetate. While the acetoacetoxy functional moiety-containing ingredients disclosed in U.S. Pat. No. 5,498,659 may be used to provide desirable latex formulations, it has been found that the production of such formulations on a large scale is difficult.

Copending U.S. applicantion Ser. No. 08/518,941, filed Aug. 24, 1995, teaches ethylenically unsaturated 1,3-diketoamide functional compounds, polymers and latex formulations containing the same. Latexes made utilizing such unsaturated functional compounds possess improved hydrolytic stability.

The use of latex seeds in polymerization reactions to obtain latex polymers having uniform particle size is disclosed, for example, in U.S. Pat. No. 5,189,107, U.S. Pat. No. 4,122,136 and U.S. Pat. No. 3,687,923. Copending U.S. Pat. application Ser. No. 08/539,808, filed Oct. 5, 1995, describes the use of latex seeds in combination with the generation of a gradient polymeric morphology by varying the concentration ratio of the monomer feeds. None of these references disclose or suggest that novel single-package aqueous polymeric formulations could be prepared effectively on a large scale through the use of latex seed technology.

A high quality latex formulation including pendant moieties having the ability to form stable enamine structures by reaction with amines, e.g., acetoacetoxy functional pendent moieties, that can readily be prepared in an effective large scale manner will advantageously provide significant commercial advantage ever prior art formulations.

SUMMARY OF THE INVENTION

This invention relates to a single-package aqueous polymeric formulation comprising (a) a polymeric ingredient having (i) a latex seed core and both (ii) acid functional pendant moieties and (iii) pendant moieties having the ability to form stable enamine structures by reaction with amines which contain a divalent group of the structure

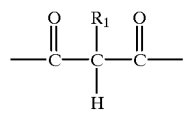

wherein $R_1$ is either H, a $C_1$ to $C_{10}$ alkyl group, or phenyl; (b) a non-polymeric functional amine having at least two amine functional moieties; (c) an effective amount of base to inhibit crosslinking of the polymeric ingredient with the non-polymeric polyfunctional amine; and (d) an evaporable aqueous carrier. Preferably, the polymeric ingredient is also derived from a crosslinkable monomer as well as at least one alkyl acrylate or methacrylate.

The polymeric ingredients employed in the formulation of this invention advantageously have a number average particle size in a range from about 40 nanometers to about 100 nanometers. The polymeric formulation of this invention having such a polymeric ingredient advantageously provides films with excellent substrate sealing ability, as well as enhanced water and solvent resistance, particularly when compared to known latexes having larger number average particle sizes.

The invention is also directed to an emulsion addition polymerization process for preparing the single package aqueous polymeric formulation. The process may be conducted as a single stage polymerization, but is preferably conducted as a multi-stage polymerization reaction so as to better control the properties of the resulting polymers. The process of this invention has been found to be particularly suitable for the preparation of large scale batches, e.g., 50 kg or greater, of an aqueous polymeric formulation that is subtantially free of grit, slime and gelation.

The polymeric formulation of this invention may be employed in adhesives and coatings, such as decorative or protective wood coating, paints, concrete coatings and the like.

DETAILED DESCRIPTION OF THE INVENTION

The polymeric ingredient employed in the aqueous polymeric formulation of this invention has incorporated therein latex seed particles having a number average particle size in the range from about 20 nanometers to about 60 nanometers. The preparation of such latex seed particles is well known to those skilled in the art. The latex seed particles used in this invention may be prepared using a single monomer or a mixture of monomers. A crosslinking agent may also be used if desired. A preferred latex seed particle of this invention is comprised of styrene and about 5 to 15% by weight of a divinylbenzene crosslinking agent. Preferably, this polystyrene latex seed has a number average particle size of 25 to 40 nanometers and most preferably of 33 to 35 nanometers. However, any latex seed particle within the above defined number average particle size range may be employed which allows for the preparation of the seed polymerized latex polymers of this invention.

The particle size of the latex seed particles and the prepared latex polymers of this invention are typically measured using a QELS (quasi elastic light scattering) technique to provide a number average particle size having a distribution of plus or minus about 2 nanometers. QELS is a well known technique to those skilled in the art. Other known particle size measurement techniques which may be employed, if desired, include capillary hydrodynamic fractionation, electron microscopy or size exclusion chromatography.

Acetoacetoxy-type functional moiety-containing ingredients, suitable for purposes of the present invention are disclosed in U.S. Pat. No. 5,498,659, U.S. Pat. No. 5,605,952, and copending U.S. application Ser. No. 08/518, 941, filed Aug. 24, 1995, the disclosure of each of which is incorporated by reference as if fully set forth herein. Such acetoacetoxy functional monomers have the ability to form stable enamine structures by reaction with amines, and have the following structure:

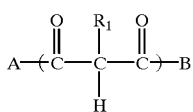

wherein $R_1$ is either H, alkyl (i.e., $C_1$ to $C_{10}$), or phenyl;
wherein A is either:

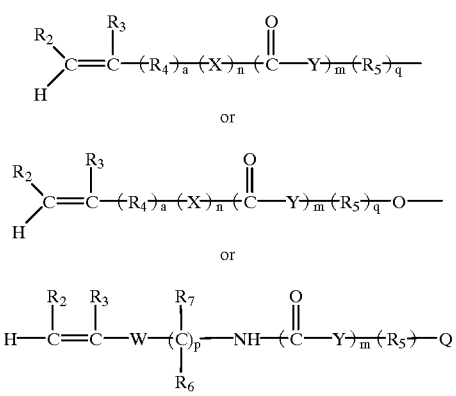

wherein $R_2$ is either H, alkyl (i.e., $C_1$ to $C_{10}$) phenyl, substituted phenyl, phenylalkyl, halo, $CO_2CH_3$ or CN;
wherein $R_3$ is either H, alkyl (i.e., $C_1$ to $C_{10}$), phenyl, substituted phenyl, phenylalkyl or halo;
wherein $R_4$ is either alkylene (i.e., $C_1$ to $C_{10}$), phenylene, or substituted phenylene;

wherein $R_5$ is either alkylene or substituted alkylene;
wherein $R_6$ and $R_7$ are independently either H, alkyl (i.e., $C_1$ to $C_{10}$), phenyl, substituted phenyl or phenylalkyl;
wherein any of "a", "m", "n", "p" and "q" is either 0 or 1;
wherein each of "X" and "Y" is either —HN— or —O—;
wherein "W" is arylene having 6 to 20 carbon atoms;
wherein "Q" is O or a single bond;
and wherein "B" is either "A", alkyl (i.e. $C_1$ to $C_{10}$), phenyl, substituted phenyl, or heterocyclic.

The term "substituted" as used herein includes, for example, hydroxyl, alkyl (having 1 to 10 carbons), alkoxy (having 1 to 10 carbons), halo, amino, aralkyl (having 7 to 20 carbons), alkaryl (having 7 to 20 carbons), and aryl (having 6 to 20 carbons) substituents. The term heterocyclic includes an aromatic or nonaromatic monocyclic or bicyclic group having 4 to 20 members in the ring system and at least one of the members being a hetero atom, e.g., nitrogen, sulfur or oxygen, with the remaining members being carbon atoms.

Preferred ethylenically-unsaturated acetoacetoxy-type functional moiety-containing ingredients include, among the following, various acetoacetamides, including but not limited to:

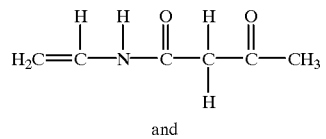

and

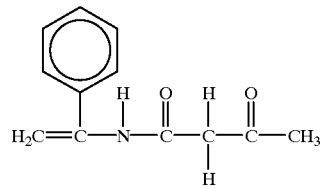

acetoacetoxyethyl methacrylate ("AAEM"); acetoacetoxyethyl acrylate ("AAEA"); allyl acetoacetate; vinyl acetoacetate; and combinations thereof. AAEM is structurally represented as:

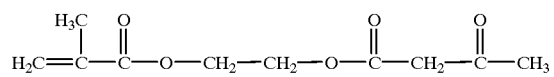

AAEA is structurally represented as:

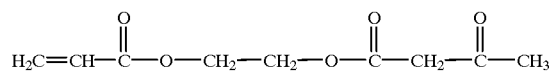

allyl acetoacetate is structurally represented as:

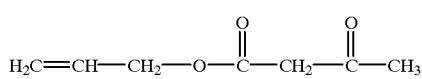

vinyl acetoacetate is structurally represented as:

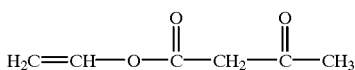

and 3-isopropenyl-α,α-dimethylbenzyl amidoacetoacetate is structurally represented as:

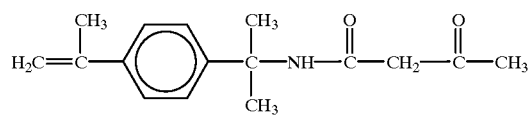

Particularly preferred ethylenically-unsaturated acetoacetoxy-type functional moiety-containing ingredients are acetoacetoxyethyl methacrylate ("AAEM"), acetoacetoxyethyl acrylate ("AAEA"), and combinations thereof.

The carboxylic acid functional pendant moieties are derived from ethylenically-unsaturated carboxylic acid moiety-containing monomers. Those suitable for purposes of the invention include, but are not limited, to acrylic acid, methacrylic acid, fumaric acid-monoethyl ester, fumaric acid, itaconic acid, maleic acid, maleic anhydride, methacrylic acid, fumaric acid-monomethyl ester, methyl hydrogen maleate, and combinations thereof. However, the polymeric ingredient employed in this invention may be prepared with any addition-copolymerizable monomer that does not inhibit the acetoacetoxy functionality of the resulting copolymer.

Preferred ethylenically-unsaturated carboxylic acid moiety-containing monomers are selected from the group consisting of acrylic acid, methacrylic acid, and combinations thereof.

The ethylenically-unsaturated carboxylic acid moiety-containing monomers and the acetoacetoxy functional moiety containing monomers can be used to make a polymeric ingredient having both acid-functional pendant moieties and acetoacetoxy functional pendant moieties. It is also possible to prepare two separate polymeric ingredients, one of which has acid-functional pendant moieties and the other having pendant moieties having the ability to form stable enamine structures by reaction with amines such as acetoacetoxy functional pendant moieties and mix those polymeric ingredients together.

The monomers used to prepared the polymeric ingredients are typically polymerized in the presence of a catalytic amount of a conventional free-radical initiator. Suitable initiators, also called catalysts, include but are not limited to certain water-soluble initiators, various azo compounds, select redox combinations and organic peroxides. However, any initiator capable of generating free-radicals may be employed.

Suitable water-soluble initiators include but are not limited to peracetic acid; certain perborates; certain percarbonates; certain perphosphates; certain persulfates, such as sodium, potassium, ammonium, and barium persulfate; acetyl peroxide; hydrogen peroxide; hydroperoxides such as tertiary-butyl hydroperoxide; and combinations thereof. A presently preferred water-soluble free-radical initiator is ammonium persulfate.

Suitable azo initiators include but are not limited to azodiisobutyl nitrile; azobisdimethyl valeronitrile; azodiisobutyl amide; azobis(alpha-ethylbutyl nitrile); azobis(alpha, gamma-dimethyl-capronitrile); and combinations thereof.

One redox combination, suitable for purposes of the present invention, may consist of a water-soluble persulfate as the oxidizing component of the redox combination, and a hydrosulfite, e.g. sodium hydrosulfite, as the reducing component of the redox combination. It is also possible to use water-soluble bisulfites, metabisulfites and/or thiosulfates, and formaldehyde sulfoxylates in lieu of the hydrosulfites.

INDUSTRIAL APPLICABILITY

The single package aqueous polymeric formulations of this invention can be utilized to produce surface coatings as floor polishes, paints, adhesives and so forth. More particularly, these compositions produce durable, abrasion-resistant and solvent-resistant surface coatings or finishes on various substrates such as cardboard, concrete, counter tops, floors, marble and terrazzo, paper, stone, tile, wood and a variety of metal surfaces including polished metal surfaces and metal foils.

Still another application for the polymeric formulation of this invention is in the production of water-based adhesives for various consumer and industrial uses.

Industrial end-use applications include surface coatings and finishes for construction machinery and equipment, for bridges and road surfaces, for various parts or components of certain production-line machinery, and for a wide assortment of automotive components.

Consumer end-use applications include durable polymeric films and surface coatings for various components of such a wide assortment of home-use appliances as clothes washers and dryers, dishwashers, radios, ranges and ovens, refrigerators, television sets, and video cassette recorders.

End-use applications for wood for industrial use, home use, and otherwise, include but are not limited to interior and exterior wood surface coatings such as stains and varnishes.

The novel polymeric formulations of this invention can also be used by industry or consumers as thickeners for paints and other surface coatings, as well as thickeners for printing inks and other formulations which need to crosslink upon drying. Further in that regard, various specific polymeric formulations produced in accordance with the principles of the present invention are able to provide certain finishes as well as other surface treatments for a number of relatively thin substrates such as paper, wherein such finishes and surface treatments are able to crosslink without liberating formaldehyde. Such an end use is particularly desirable, for example, in the production of release coatings, overprint varnishes, and especially in relation to the production of rotogravure coatings.

Yet another specific end use for the polymeric formulations of the present invention is in the production of a wide assortment of architectural surface coatings which need to form films of various thicknesses, at relatively low temperatures, from about 25° C. to about 0° C. and yet which provide desirable surface hardness and durability qualities, due to their crosslinked polymeric structure.

The novel polymeric formulation of this invention can, moreover, be shipped in bulk-sized quantities or in various smaller-sized containers, as desired. For example, to satisfy certain industrial users, the formulation of this invention can readily be shipped in 55-gallon drums, or in larger quantities such as in rail cars, if desired. Yet, if consumers desire smaller, more conveniently-sized volumetric quantities, the polymeric formulation can be sold in 1-gallon or smaller containers or even in conventional aerosol containers.

The polymeric formulations of this invention are susceptible to embodiment in various forms. Described below are several presently preferred embodiments, with the understanding that these embodiments are merely examples of the present invention and are not limiting thereof.

The term "dispersion" as used herein means a two-phase system of which one phase consists of finely-divided particles, often in the colloidal-size range, distributed throughout a bulk substance, wherein such finely-divided particles provide the disperse or internal phase and the bulk substance provides the continuous or external phase.

The term "elevated temperature" as used herein means any temperature greater than room temperature, which is 20 to 25° C.

The polymeric formulation of this invention can be a low-VOC, ("Volatile Organic Content") water-based composition of matter that may contain only one polymeric ingredient or that may contain at least two polymeric ingredients. In the former case, the polymeric ingredient must possess both acid-functional as well as acetoacetoxy functional pendant moieties; and in the latter case, one polymeric ingredient has acid-functional pendant moieties and the other polymeric ingredient has acetoacetoxy functional moieties.

A polymeric ingredient containing both acid and acetoacetoxy functional moieties is most preferred. This polymeric ingredient containing a latex seed core and having both acetoacetoxy and acid functional moieties preferably has a number average particle size in a range of about 40 nanometers to about 100 nanometers, preferably about 50 nanometers to 80 nanometers. The relatively small particle size of the polymeric ingredient has been found to provide films with better substrate sealing ability and greater $H_2O$ and solvent resistance than exhibited by larger particle sizes, e.g. 110–130 nanometers.

If the polymeric ingredient contains both acid functionality and acetoacetoxy functionality, then preferably the amount of acid functionality is sufficient to provide the polymeric ingredient with an acid number in the range of about 30 to about 300; and the weight-average molecular weight ("Mw") value of such a polymeric ingredient is typically between about 2,000 and 50,000. Preferably, such a polymeric ingredient has an acid number in the range of about 50 to about 150 and a Mw value of about 2,000 to about 40,000, and more preferably a Mw value of about 2,000 to about 30,000.

However, in the case where there are at least two different polymeric ingredients, the polymeric ingredient having acetoacetoxy functional pendant moieties typically has an Mw value of about 2,000 to about 1,000,000. Preferably, the Mw value is between about 5,000 and about 500,000; more preferably, the Mw value is between about 15,000 and about 300,000; and most preferably, the Mw value is between about 50,000 and about 200,000. In this case the polymeric ingredient possessing acid functionality may only be polymeric in structure. Such a polymeric ingredient also preferably has an acid number in the range of about 50 to about 150 as well an Mw value of preferably about 2,000 to about 40,000, more preferably about 2,000 to about 30,000.

The polymeric formulation of this invention includes a polyfunctional amine containing compound. The polymeric formulation is delivered as a single-package composition. The single-package composition is prepared by mixing the polymeric ingredient and polyfunctional amine containing compound together and storing the mixture until use.

The preferred polyfunctional amine-containing compound, possessing at least two amine-functional moieties, is a non-polymeric polyfunctional amine-containing compound which typically has a chemical formula weight of less than about 2,000 grams per mole, and preferably has a chemical formula weight of less than about 1,000 grams per mole. However, any polyfunctional amine-containing compound that can crosslink with the acetoacetoxy functional pendant moieties of the polymeric ingredient may be employed in the polymeric formulation of this invention.

The polymeric formulation of this invention may be produced by combining preselected relative amounts of latex seed particles having a number average particle size in a range from about 20 nanometers to about 60 nanometers, preferably about 25 manometers to 40 nanometers, initiator, surfactant and evaporable aqueous carrier in an agitated reactor of suitable size, and heating the agitated reactor contents to a desired reaction temperature, typically 40 to 90° C., more preferably 75 to 85° C., over a predetermined period of time, which may typically be about 1 hour. At least one optional chain-transfer agent may also be incorporated into the agitated reactor contents at this time, if desired. Nitrogen or another suitable inert gas may be introduced into the reactor headspace to eliminate oxygen from the reaction vessel, if desired. If desired, the latex seed particles may be introduced to the reactor by the in situ preparation therein.

The surfactant ingredient or ingredients typically comprises at least one non-ionic emulsifier, at least one anionic emulsifier, or a mixture of non-ionic and anionic emulsifiers. Cationic emulsifiers as well as amphoteric emulsifiers may also be used in certain situations if desired.

Examples of useful anionic surfactants include but are not limited to organosulfates and sulfonates, for example, sodium and potassium alkyl, aryl and alkaryl sulfates and sulfonates, such as sodium 2-ethyl hexyl sulfate, potassium 2-ethyl hexyl sulfate, sodium nonyl sulfate, sodium lauryl sulfate ("NaLS"), potassium methylbenzene sulfonate, potassium toluene sulfonate, and sodium xylene sulfonate; higher fatty alcohols, for example, stearyl alcohols, lauryl alcohols, and so forth, which have been ethoxylated and sulfonated; dialkyl esters of alkali metal sulfosuccinic acid salts, such as sodium or potassium diamyl sulfosuccinates, in particular sodium dioctyl sulfosuccinate; various formaldehyde-naphthalene sulfonic acid condensation products; alkali metal salts, as well as partial alkali metal salts, and free acids of complex organic phosphate esters; and combinations thereof.

Examples of non-ionic surfactants which can be used to prepare the polymeric formulation of this invention include but are not limited to polyesters, for example, ethylene oxide and propylene oxide condensates which include straight and/or branched chain alkyl and alkaryl polyethylene glycol and polypropylene glycol ethers and thioethers; alkylphenoxy poly(ethyleneoxy) ethanols having alkyl groups containing from about 7 to about 18 carbon atoms and having from about 4 to about 240 ethyleneoxy units, such as heptyl-phenoxy poly(ethyleneoxy) ethanols, nonyl-phenoxy poly(ethyleneoxy)ethanols, and so forth; the polyoxyalkylene derivatives of hexitol, including sorbitans, sorbides, mannitans, and mannides; partial long chain fatty-acid esters, such as the polyoxyalkylene derivatives of sorbitan monolaurate, sorbitan monopalmitate, sorbitan monostearate, sorbitan tristearate, sorbitan monooleate, and sorbitan trioleate; the condensates of ethylene oxide with a hydrophobic base, such as a base that is formed by condensing propylene oxide with propylene glycol; sulfur-containing condensates, for example, those prepared by condensing ethylene oxide with higher alkyl mercaptans, such as nonyl, dodecyl, or tetradecyl mercaptan, or with alkyl thiophenols wherein the alkyl group contains from about 6 to about 15 carbon atoms; ethylene oxide derivatives of long-chain carboxylic acid, such as lauric, myristic, palmitic, or oleic acids or mixtures of acids, such as tall oil fatty acids; ethylene oxide derivatives of long chain alcohols such as octyl, decyl, lauryl, or cetyl alcohols; and combinations thereof.

In the preparation of certain preferred embodiments of the polymeric formulations of the invention, the evaporable carrier will consist essentially of water only. However, in the preparation of certain other embodiments of the polymeric formulations of the invention, it will be desirable that the evaporable carrier comprise water and at least one other water-miscible volatile organic liquid, wherein the amount of VOC does not exceed 200 grams per liter of the formulation.

Examples of water-miscible volatile organic liquids that are useful in this regard include but are not limited to alcohols; dialkyl ethers; ethylene and propylene glycols and their monoalkyl and dialkyl ethers; relatively low formula weight polyethylene oxides and their alkyl and dialkyl ethers (i.e., having a chemical-formula weight of less than about 200 grams per mole); dimethyl formamide; dimethyl acetamide; and combinations thereof.

After the desired reaction temperature is achieved, an emulsion-polymerizable mixture is incorporated into the agitated reactor contents over a predetermined period of time, such as 1 hour, while maintaining the desired reaction temperature.

The emulsion-polymerizable mixture includes at least one acetoacetoxy functional moiety-containing monomeric ingredient and at least one acid moiety-containing monomeric ingredient, which is typically ethylenically-unsaturated.

The emulsion-polymerizable mixture may optionally further include other types of ethylenically unsaturated monomers, i.e., those containing at least one polymerizable carbon-to-carbon unsaturated double bond, provided that any such additional optional ingredient is addition-polymerizable with the acetoacetoxy functional moiety-containing and acid moiety-containing ingredients described above.

These compounds are well known and include, for example, $C_2$ to $C_{20}$ alkenes, $C_3$ to $C_{20}$ alkadienes, $C_5$ to $C_{20}$ alkatrienes, $C_5$ to $C_{20}$ cycloolefins, vinyl substituted aromatics, acrylic or methacrylic acid, $C_1$ to $C_{20}$ alkyl esters of acrylic acid or methacrylic acid, $C_6$ to $C_{20}$ aryl esters of acrylic or methacrylic acid, $C_7$ to $C_{20}$ aralkyl esters of acrylic or methacrylic acid and the like.

More particularly, such ethylenically unsaturated monomers include, without limitation, ethylene, propylene, 1-butene, 2-butene, isobutene, 1-pentene, 2-methyl-2-butene, 1-hexene, 4-methyl-1-pentene, 3,3-dimethyl-1-butene, 2,4,4-trimethyl-1-pentene, 6-ethyl-1-hexene, 1-heptene, 1-octene, 1-decene, 1-dodecene, allene, butadiene, isoprene, chloroprene, 1,5-hexadiene, 1,3,5-hexatriene, divinylacetylene, cyclopentadiene, dicyclopentadiene, norbornene, norbornadiene, methylnorbornene, cyclohexene, styrene, alpha-chlorostyrene, alpha-methylstyrene, allylbenzene, phenylacetylene, 1-phenyl-1,3-butadiene, vinylnaphthalene, 4-methylstyrene, 4-methoxy-3-methylstyrene, 4-chlorostyrene, 3,4-dimethyl-alphamethylstyrene, 3-bromo-4-methyl-alpha-methylstyrene, 2,5-dichlorostyrene, 4-fluorostyrene, 3-iodostyrene, 4-cyanostyrene, 4-vinylbenzoic acid, 4-acetoxystyrene, 4-vinyl benzyl alcohol, 3-hydroxystyrene, 1,4-dihydroxystyrene, 3-nitrostyrene, 2-aminostyrene, 4-N,N-dimethylaminostyrene, 4-phenylstyrene, 4-chloro-1-vinylnaphthalene, acrylic acid, methacrylic acid, acrolein, methacrolein, acrylonitrile, methacrylonitrile, acrylamide, methacrylamide, methyl acrylate, methyl methacrylate, norbornenyl acrylate, norbornyl diacrylate, 2-hydroxyethyl acrylate, 2-phenoxyethyl acrylate, trimethoxysilyloxypyropyl acrylate, dicyclopentenyl acrylate, cyclohexyl acrylate, 2-tolyloxyethyl acrylate, N,N-dimethylacrylamide, isopropyl methacrylate, ethyl acrylate, methyl alphachloroacrylate, beta-dimethylaminoethyl methacrylate, N-methyl methacrylamide, ethyl methacrylate, 2-ethylhexyl acrylate, neopentyl glycol diacrylate, cyclohexyl methacrylate, hexyl methacrylate, 2-methylcyclohexyl methacrylate, beta-bromoethyl methacrylate, benzyl methacrylate, phenyl methacrylate, neopentyl methacrylate, butyl methacrylate, chloroacrylic acid, methyl chloroacrylic acid, hexyl acrylate, dodecyl acrylate, 3-methyl-1-butyl acrylate, 2-ethoxyethyl acrylate, phenyl acrylate, butoxyethoxyethyl acrylate, 2-methoxyethyl acrylate, isodecyl acrylate, pentaerythritol triacrylate, methoxy poly (ethyleneoxy)$_{12}$ acrylate, tridecoxy poly(ethyleneoxy)$_{12}$ acrylate, chloroacrylonitrile, dichloroisopropyl acrylate, ethacrylonitrile, N-phenyl acrylamide, N,N-diethylacrylamide, N-cyclohexyl acrylamide, vinyl chloride, vinylidene chloride, vinylidene cyanide, vinyl fluoride, vinylidene fluoride, trichloroethane, vinyl acetate, vinyl propionate, vinyl butyrate, vinyl benzoate, vinyl butyral, vinyl chloroacetate, isopropenyl acetate, vinyl formate, vinyl methoxyacetate, vinyl caproate, vinyl oleate, vinyl adipate, methyl vinyl ketone, methyl isopropenyl ketone, methyl alpha-chlorovinyl ketone, ethyl vinyl ketone, hydroxymethyl vinyl ketone, chloromethyl vinyl ketone, allilydene diacetate, methyl vinyl ether, isopropyl vinyl ether, butyl vinyl ethers, 2-ethylhexyl vinyl ether, 2-methoxyethyl vinyl ether, 2-chloroethyl vinyl ether, methoxyethoxy ethyl vinyl ether, hydroxyethyl vinyl ether, aminoethyl vinyl ether, alpha-methylvinyl methyl ether, divinyl ether, divinylether of ethylene glycol or diethylene glycol or triethanolamine cyclohexyl vinyl ether, benzyl vinyl ether, phenethyl vinyl ether, cresyl vinyl ether, hydroxyphenyl vinyl ether, chlorophenyl vinyl ether, naphthyl vinyl ether, dimethyl maleate, diethyl maleate, di(2-ethylhexyl) maleate, maleic anhydride, dimethyl fumarate, dipropyl fumarate, diamyl fumarate, vinyl ethyl sulfide, divinyl sulfide, vinyl p-tolyl sulfide, divinyl sulfone, vinyl ethyl sulfone, vinyl ethyl sulfoxide, vinyl sulfonic acid, sodium vinyl sulfonate, vinyl sulfonamide, vinyl benzamide, vinyl pyridine, N-vinyl pyrollidone, N-vinyl carbazole, N-(vinyl benzyl)-pyrrolidine, N-(vinyl benzyl) piperidine, 1-vinyl pyrene, 2 isopropenyl furan, 2-vinyl dibenzofuran, 2-methyl-5-vinyl pyridine, 3-isopropenyl pyridine, 2-vinyl piperidine, 2-vinyl quinoline, 2-vinyl benzoxazole, 4-methyl-5-vinyl thiazole, vinyl thiophene, 2-isopropenyl thiophene, indene, coumarone, 1-chloroethyl vinyl sulfide, vinyl 2-ethoxyethyl sulfide, vinyl phenyl sulfide, vinyl 2-naphthyl sulfide, allyl mercaptan, divinyl sulfoxide, vinyl phenyl sulfoxide, vinyl chlorophenyl sulfoxide, methyl vinyl sulfonate, vinyl sulfoanilide and the like.

Additional exemplary ethylenically unsaturated monomers which are suitable crosslinking agents for use in this invention include, without limitation, divinyl benzene, ethylene glycol diacrylate, ethylene glycol dimethacrylate, trimethylol propane triacrylate, trimethylol propane trimethacrylate, pentaerythritol triacrylate, pentaerythritol trimethacrylate, 1,6-hexanediol diacrylate, allyl acrylate, allyl maleate, allyl methacrylate, diallyl maleate, polyethylene glycol diacrylate and polyethylene glycol dimethacrylate and the like.

Preferred optional ethylenically unsaturated monomers include acrylic and methacrylic acid esters, such as, for example, methyl acrylate ("MA"), methyl methacrylate ("MMA"), ethyl acrylate, ethyl methacrylate, propyl acrylate, propyl methacrylate, butyl acrylate ("BA"), butyl methacrylate, 2-ethyl hexyl acrylate ("2-EHA"), 2-ethyl hexyl methacrylate, decyl acrylate, decyl methacrylate, hydroxyethyl acrylate, hydroxyethyl methacrylate ("HEMA"), hydroxypropyl acrylate, hydroxypropyl methacrylate, styrene and α-methyl styrene and combinations thereof.

As was briefly mentioned above, one step of a preferred process of producing the polymeric formulation of this invention is to combine preselected relative amounts of initiator, surfactant, evaporable aqueous carrier and emulsion-polymerizable ingredients in an agitated reactor of suitable size. Preferably, the reactor is heated to a desired reaction temperature and held at that temperature while the ingredients are added over a predetermined period of time, thereby producing an aqueous polymeric emulsion. Optionally, chain-transfer agent may also be used at this time, if desired.

During the reaction-hold period, while the emulsion-polymerizable ingredients are addition-polymerizing, it may be desirable to incorporate certain additional amounts of initiator or initiators, into the agitated reactor contents, to achieve a desired degree or percentage of conversion or reaction of polymerizable ingredients. Such additional amounts of initiator or ingredients may be the same as or may be different from the initiator ingredient or ingredients selected initially. Again, optional chain-transfer agent may be used, if desired.

For purposes of controlling the viscosity value of the polymeric formulation, it may be necessary to regulate the molecular weight of the polymer being formed. This can be accomplished by the incorporation into the reactor contents of a suitable chain-transfer agent. Suitable chain-transfer agents, to achieve this purpose, are well-known and include various halo-organic compounds such as carbon tetrabromide and dibromodichloromethane; sulfur-containing compounds such as the aklythiols including ethanethiol, butanethiol, tert-butyl and ethyl mercaptoacetate, as well as the aromatic thiols; and various other organic compounds having hydrogen atoms which are readily abstracted by free radicals during polymerization.

The amount of chain-transfer agent needed to achieve a particular molecular weight, moreover, can be estimated by the use of the Mayo equation. (See e.g., pages 226–233 of a text entitled *Principles of Polymerization*, second edition, by George Odian, published 1981 by John Wiley & Sons, Inc.)

Additional suitable chain-transfer agents or ingredients include but are not limited to butyl mercapto propionate; iso octyl mercapto propionic acid; iso octyl mercapto propionate ("IOMP"); bromoform; bromotrichloromethane ("BTCM"); carbon tetrachloride; alkyl mercaptans such as n-dodecyl mercaptan, tertiary-dodecyl mercaptan, octyl mercaptan, tetradecyl mercaptan, and hexadecyl mercaptan; alkyl thioglycolates such as butyl thioglycolate, iso octyl thioglycolate, and dodecyl thioglycolate; thioesters; and combinations thereof.

Since the polymeric formulation contains acid functionality, then upon achieving the described reaction conversion, the pH of the reactor contents will be less than 7, and typically will be in the range of 2.5 to 6. An effective amount of base is preferably then added to the reactor contents for preventing gellation. Most preferably, the base is a volatile base. The evaporation of the volatile base from the polymeric formulation enables the final crosslinking reaction of the polymeric ingredients to take place.

If the acid value of the emulsion polymer is low (below about 80 mg KOH/g of polymer), the polymer will typically not completely dissolve when the basic component is added; and the white, milky appearance may thus persist. The polymer particles may become swollen or may be relatively unaffected by the base, depending upon the specific monomers used and the acid value of the polymer.

Preferably, the polymeric formulation includes an amount of base which is effective for providing extended single-package storage stability, most preferably a volatile base. The amount of base necessary to effectively avoid gellation can be readily determined by a person of ordinary skill without undue experimentation.

As noted previously, a suitable polyfunctional amine-containing compound having at least two amine-functional moieties is also incorporated into the aqueous polymeric emulsion before storage (a single-package composition). Whereas one skilled in the art would expect the polyfunctional amine ingredient of the formulation to crosslink with the acetoacetoxy functional groups via enamine formation in a single-package system, and thereby cause gellation, surprisingly, such gellation may be avoided. Without being bound to theory, it is believed that the mechanism for stabilization of the formulation containing both acetoacetoxy functional groups and carboxyl functionality is complex and probably results from (a) the base competing with the polyfunctional amine in reaction with the acetoacetoxy groups, thereby reducing the degree of crosslinking in the liquid state, and (b) the base neutralizing carboxylic acid groups on the polymer, thereby forming carboxylate ions, which would increase the solubility of the polymer and thereby lead to swelling rather than to agglomeration.

In such single-package formulations, it is believed that at least some of the crosslinking, or in certain situations a major portion of the crosslinking, may be taking place in the liquid phase, possibly within several (i.e., 1 to 4) hours of adding the polyfunctional amine. Accordingly, while not wanting to be tied to conjecture, yet desirous of providing a complete disclosure, it is presently postulated that addition of base to the reactor contents containing both acetoacetoxy functional groups and carboxyl functional groups may (1) compete with the amine-functional moieties vis-a-vis the acetoacetoxy functional moieties, thereby reducing the degree of crosslinking, and/or (2) enhance the colloidal stability of the polymer dispersion which forms when the crosslinking reaction takes place.

In order to obtain preferred compositions or formulations having superior stability and which provide coatings possessing superior coating properties, it is suggested that the acid value of the polymeric ingredient be between about 30 and 300, and it is preferred that the acid value of the polymeric ingredient be between about 50 and 150, which will typically provide an alkali-soluble or alkali-swellable polymeric ingredient. Since the viscosity of the aqueous composition of matter is very molecular-weight dependent, it is preferred that the molecular weight range of the emulsion polymer be relatively low, in order to maintain desired, low viscosity values at practical solids levels. The Mw of the emulsion polymer should thus be in the range of between about 2,000 and 50,000 and preferably in the range of between about 2,000 to about 40,000, and more preferably in the range of between about 2,000 to about 30,000.

For purposes of dissolving such a polymeric ingredient, i.e., one having both pendant moieties having the ability to form stable enamine structures by reaction with amines, e.g., acetoacetoxy functional moieties, and carboxyl functional moieties, in the aqueous carrier, it has been found that ammonia, an amine, an alkali metal hydroxide, or various combinations of these may be used, if desired. Suitable amines for such a purpose include but are not limited to methyl amine, dimethyl amine, trimethyl amine, ethyl amine, diethyl amine, triethyl amine, propyl amine, dipropyl amine, butyl amine, and combinations thereof. (It is understood that the term "propyl" may include n-propyl, isopropyl and combinations of these, and that the term "butyl" may include n-butyl, sec-butyl, tert-butyl and combinations of these, and so forth.) As noted previously, the most preferred amines are volatile, such as ammonia and other volatile amines.

The polymeric formulations of this invention may also be prepared using an emulsion polymerization reaction conducted, for example, by performing the step of introducing a major portion of the total amount of initiator, surfactant, optional chain-transfer agent, and evaporable aqueous carrier into the reaction vessel, in the manner described above, and separately performing the step of pre-emulsifying the emulsion-polymerizable mixture in a minor portion of the total amount of initiator, surfactant, optional chain-transfer agent, and evaporable aqueous carrier, for purposes of producing a pre-emulsion mixture; and, thereafter, performing the step of introducing the pre-emulsion mixture into the reaction vessel which already contains the major portion amounts of initiator, surfactant, optional chain-transfer agent, and evaporable aqueous carrier. Preferably, the reaction vessel is heated to the desired reaction temperature prior to adding the pre-emulsion.

In yet another preferred embodiment of the invention, the polymeric formulation of the present invention includes a mixture of at least two polymeric ingredients. A first polymeric ingredient includes pendant moieties having the ability to form stable enamine structures by reaction with amines, e.g., acetoacetoxy functional pendant moieties; and a second polymeric ingredient includes acid-functional pendant moieties. Indeed, it is not necessary to have both functionalities in a single polymeric ingredient to achieve satisfactory storage stability of the formulation as well as satisfactory crosslink ability of the resultant polymeric surface coating. In particular, in the case where the formulation contains at least two polymeric ingredients, the formulation can be prepared according to well-known staged polymeric reactions. (See, e.g., U.S. Pat. No. 4,325,856 to Ishikawa et al. or U.S. Pat. No. 4,894,397 to Morgan et al.) In that regard, the acetoacetoxy functional moiety-containing polymeric ingredient may be water-insoluble and/or alkali-insoluble; or the acetoacetoxy functional moiety-containing polymeric ingredient may be rendered water-soluble and/or alkali-soluble by the incorporation of such monomers as acrylamide and/or acrylamide derivatives, hydroxy-functional monomers, such as hydroxyethyl acrylate, or other monomers known to impart water-solubility to polymers, such as monomers having ethylene oxide chains of predetermined length.

Further in that regard, while the above-described polymeric ingredients of the present invention are preferably made via conventional emulsion-polymerization methods, the above-described polymeric ingredients of the present invention may also be made via conventional solution-polymerization or conventional bulk-polymerization methods, if desired.

For example, suitable conventional methods for producing the alkali-soluble or alkali-swellable polymeric ingredients of the present invention via various well-known solution-polymerization mechanisms are disclosed for example in U.S. Pat. No. 3,673,168 to Burke, Jr., et al.; in U.S. Pat. Nos. 3,753,958 and 3,879,357, both to Wingler et al.; and in U.S. Pat. No. 3,968,059 to Shimada et al. Also, suitable conventional methods for producing the polymeric ingredients used in the present invention via conventional bulk-polymerization mechanisms are disclosed in U.S. Pat. No. 4,414,370 to Hamielec et al.; in U.S. Pat. No. 4,529,787 to Schmidt et al.; and in U.S. Pat. No. 4,546,160 to Brand et al.

As was mentioned above, it is believed that the above discussed polymeric ingredients containing the acetoacetoxy functional pendent moieties do crosslink to some degree with the amine-functional moieties of the polyfunctional amine when the latter is added to the formulation having carboxyl functionality. It is believed that the lack or delay in onset of gelation may be a result of the presence of the base ingredient in the reactor contents. Thus, the presence of the base in the single-package polymeric formulation of this invention is highly preferred.

The most preferred method of preparing the aqueous polymeric formulation of this invention employs a multi-stage polymerization process. As previously described, first the reactor is charged with (i) latex seed particles having a number average particle size in a range from about 20 manometers to about 60 nanometers, (ii) an initiator, (iii) a surfactant and (iv) an evaporable aqueous carrier. These ingredients are heated with agitation to a desired reaction temperature, typically 40° C. to 90° C., more preferably 75° C. to 85° C. over a predetermined period of time, e.g. 30 minutes. More preferably, the initiator is combined with an amount of aqueous evaporable carrier and separately charged to the reactor after the introduction of the latex seed particles, surfactant and evaporable aqueous carrier.

Next, the emulsion polymerizable ingredients of the first stage are added to the emulsion polymerization reactor. The emulsion polymerizable ingredients of the first stage comprise at least one addition polymerizable ethylenically unsaturated monomer, preferably at least one monomer containing pendant moieties having the ability to form stable enamine structures by reaction with amines or an acid functional monomer, most preferably, both an acid functional monomer and a monomer containing pendant moieties having the ability to form stable enamine structures by reaction with amines, e.g., an acetoacetoxy functional monomer. The first stage emulsion polymerizable ingredients are addition polymerized at a desired reaction temperature as described above, e.g. 40° C. to 90° C., and for a predetermined time.

The emulsion polymerizable ingredients of the first stage may be fed to the reactor as a single feed, or if desired by a multiple feed. The feed time may vary, but generally should range from about 30 minutes to about 90 minutes. After the monomer feed is ended, the reaction mixture is preferably held for a set time, typically ranging from about 0 to about 90 minutes.

If the emulsion polymerizable ingredients of the first stage include an acid functional monomer then typically the first stage polymerization is followed by a neutralization step by the addition of a base. The amount of base added is generally an amount effective to enhance the solubility of the first stage polymeric ingredient in the evaporable aqueous carrier. As described previously, the base is preferably a volatile base, most preferably ammonia.

After completion of the first stage of polymerization, as well as any neutralization step desired, the emulsion polymerizable ingredients of the second stage are added to the emulsion polymerization reactor. The emulsion polymerizable ingredients of the second stage contains at least one addition polymerizable ethylenically unsaturated monomer. Preferably, the emulsion polymerization ingredients of the second stage contain a monomer containing pendant moieties having the ability to form stable enamine structures by reaction with amines, e.g., an acetoacetoxy functional monomer, or an acid functional monomer, most preferably an acetoacetoxy or 1,3-diketoamide functional monomer.

The emulsion polymerizable ingredients of the second stage may be introduced to the reactor by single or multiple monomer feeds, as desired. The second stage emulsion polymerizable ingredients are fed to the reactor containing the first stage polymeric ingredient having a latex seed core for a predetermined period of time, typically about 30 to about 90 minutes, while the desired second stage polymerization reaction temperature is maintained generally between about 40° C. and 90° C., more preferably between 75° C. to 85° C. Prior to incorporation of the second monomer mixture into the agitated reactor, however, additional water, surfactant, initiator, and/or optional chain-transfer agent may be added, as desired.

Preferably, the second-stage polymerizable ingredients contains a crosslinking ingredient or agent. In this regard, crosslinking agents that are suitable for purposes of the present invention include but are not limited to divinyl benzene, 1,6-hexanediol diacrylate, ethylene glycol diacrylate, ethylene glycol dimethacrylate, trimethylol propane triacrylate, trimethylol propane trimethacrylate, pentaerythritol triacrylate, pentaerythritol trimethacrylate, allyl acrylate, allyl maleate, allyl methacrylate, diallyl maleate, polyethylene glycol diacrylate, and polyethylene glycol dimethacrylate. If employed, the concentration of the crosslinking agent in the second stage polymerizable ingredients is generally in the range of about 0.25% to about 15% by weight of the monomer content of the second stage emulsion polymerizable ingredients.

Additional crosslinkers, well known to those skilled in the art and suitable for purposes of my present invention, are disclosed in U.S. Pat. No. 3,915,921 to Schlatzer, Jr., in U.S. Pat. No. 4,190,562 to Westeman, and in U.S. Pat No. 4,554,018 to Allen.

After completion of the second stage polymerization, additional polymerization stages may be performed using ethylenically unsaturated monomers as described hereinbefore. The ethylenically unsaturated monomers that are employed in any stage of the process of this invention may be selected to achieve a desired property in the ultimate product by those of ordinary skill in the art. In a particularly preferred embodiment of the present invention, a third stage polymerization is conducted by adding at least one ethylenically unsaturated monomer, e.g., styrene, to the reactor containing the second stage polymeric ingredient at the desired reaction temperature, e.g. 40° C. to 90° C. and for a predetermined time.

It should be noted that while it is preferable to incorporate the monomer having pendant moieties capable of forming stable enamine structures by reaction with amines, e.g., acetoacetoxy functional monomer, and acid functional monomer in the emulsion polymerizable ingredients of the first stage polymerization, the process of the invention encompasses any single or multi-stage polymerization process so long as the ultimate polymeric ingredient or ingredients prepared thereby incorporates at least one monomer having pendant moieties capable of forming stable enamine structures by reaction with amines, e.g., acetoacetoxy functional monomer, and at least one acid functional monomer.

During the later-stage reaction-hold periods, while the ingredients of the later-stage monomer mixture are addition-polymerizing in the presence of the dissolved or swollen latex particles of the preceding-stage polymerization, it may be desirable to incorporate further amounts of initiator into the agitated reactor contents to achieve desired conversion of later-stage reaction. Upon achieving the desired final-stage reaction conversions, then the pH of the reactor contents may be suitably adjusted, preferably using aqueous ammonia or other base, as previously described, to a pH above 7 and typically in the range of 8 to 9.75. At such pH conditions, the aqueous polymeric emulsion typically consists of insoluble latex particles of final-stage polymer, dispersed throughout the continuous phase of the emulsion.

As was briefly noted above, desired crosslinking, in accordance with one of the several, above-noted features of the present invention, occurs when the acetoacetoxy functional moieties desirably react with the amine-functional moieties of the polyfunctional amine. As noted above, the aqueous polymeric formulation of this invention includes carboxyl functionality in a single-package formulation that preferably includes an effective amount of base, "particularly volatile base", i.e., a base having a relatively high vapor pressure such as ammonia, for inhibiting undesirable reaction between the pendant moieties of the polymeric particles having the ability to form stable enamine structures by reaction with amines and the amine-functional moieties of the polyfunctional amine-containing compound, which would otherwise result in gelation. The desirable reaction, as between these mutually-reactive moieties, does not fully occur until after evaporation of the volatile components of the novel aqueous polymeric formulation.

Accordingly, a predetermined amount of the above-mentioned polyfunctional amine having at least two amine-functional moieties is, at this point in time, introduced into the agitated reactor contents, typically over a time period of 5 to 15 minutes or longer. The polyfunctional amine, upon being thus added to the reactor contents, may dissolve in the continuous phase of the emulsion or may become distributed between the continuous and dispersed phases.

In that regard, sufficient polyfunctional amine is thus incorporated into the reactor contents, so as to cause the polymeric composition therein to typically contain about 0.5 to 1.5 pendant moieties having the ability to form stable enamine structures by reaction with amines per amine-functional moiety. Significantly, the polymeric formulation thus produced, i.e., containing pendant moieties having the ability to form stable enamine structures by reaction with amines, e.g., acetoacetoxy functionality moieties, carboxyl functionality and base in combination with polyfunctional amine, may be stable for at least 12 months when stored at room temperature.

The polyfunctional amine-containing compound may be non-polymeric or polymeric, and is preferably non-polymeric. Suitable polymeric amines include, without limitation, polyethylene amine, amine functional polyureas and polyesters, and the like.

The preferred non-polymeric polyfunctional amine-containing compound employed in the latex formulations of this invention possesses at least two amine-functional moieties, preferably, for best latex stability, has a chemical-formula weight of less than about 2,000 grams per mole, and preferably has a chemical-formula weight of less than about 1,000 grams per mole. The non-polymeric polyfunctional amines suitable for purposes of the present invention include aliphatic and cycloaliphatic amines having 2 to 10 primary and/or secondary amino groups and 2 to 100 carbon atoms.

Still further in this regard, suitable non-polymeric polyfunctional amines include but are not limited to hexamethylene diamine; 1,5 hexanediamine; 2-methyl pentamethylene diamine; 1,3-diamino pentane; dodecane diamine; 1,2-diamino cyclohexane; 1,3-diamino cyclohexane; paraphenylene diamine; 3-methyl piperidine; isophorone diamine; bis-hexamethylene triamine; diethylene triamine; and combinations thereof.

Other non-polymeric polyfunctional amines, which are suitable, include those containing adducts of ethylene and propylene oxide, such as the "JEFFAMINE" series D, ED and T of Texaco Chemical Company of Houston, Tex., U.S.A.

Preferred non-polymeric polyfunctional amines include 2 to 4 primary amino groups and 2 to 20 carbon atoms. Particularly preferred non-polymeric polyfunctional amines include hexamethylene diamine, diethylene triamine, and combinations thereof.

Until use is desired, the thus-produced crosslinkable, novel aqueous single package polymeric formulation can, for example, be stored at room temperature in a conventional container such as a metal can, a squeezable plastic tube, a bulk storage tank, a glass bottle, an aerosol container, and so forth. When use is desired, the single-package formulation is applied directly to a suitable substrate. Evaporation of the evaporable components of the aqueous emulsion then occurs over a predetermined period of time, which is typically governed by ambient conditions. Such evaporation enables desirable crosslinking to take place as between the above-discussed mutually-reactive moieties. A crosslinked polymeric surface coating is thus observed to form on the substrate in due course.

The Examples which follow are intended as an illustration of certain preferred embodiments of the invention, and no limitation of the invention is implied.

EXAMPLE 1
Preparation of a Polystyrene Seed Latex

A reactor was charged with Dowfax® 2A1 surfactant (a sodium dodecyl diphenyl oxide disulfonate surfactant available from Dow Chemical Co., Midland, Mich.) (100 kg) and water (217 kg). A monomer feed was prepared containing styrene (85 kg) and divinylbenzene (8.2 kg). The reactor contents were heated to about 80° C. and that reaction temperature was maintained during the polymerization reaction. A 20% ammonium persulfate solution in water (11.3 kg) was charged to the reactor and held for 3 minutes. The styrene monomer feed was added to the charged reactor at a feed rate of 2.1 kg/min. and then held for 90 minutes. After introduction of the styrene monomer feed, a 20% APS solution in water (12 kg) was added to the reactor. The reactor was cooled to 50° C. and 1.8 kg of a 5% aqueous solution of KATHON® CG preservative was added to the reactor with stirring. The reactor feed lines were then flushed with water. The resulting polystyrene seed latex had a number average particle sized of 38±5 nanometers and about 32% by weight solids.

EXAMPLE 2

A single package aqueous polymeric formulation was prepared by a multi-stage emulsion polymerization. The polymerization reaction system consisted of a reactor or emulsion polymerization reaction zone equipped with agitation means and an inlet to receive polymerizable reactants.

The reactor was charged with the polystyrene seed latex (352 kg) prepared in accordance with the procedure described in Example 1, sodium lauryl sulfate (78 kg) and water (4,254 kg). The reaction mixture was heated to 80° C. with agitation. The 80° C. reaction temperature was maintained throughout the polymerization reaction. A 20% APS solution (78 kg) in water was charged to the reactor and the reactor contents held for 5 minutes. Next, a first monomer feed was prepared containing styrene (123 kg), methyl methacrylate (659 kg), methacrylic acid (69 kg), acetoacetoxyethyl methacrylate (131 kg) and 2-ethylhexyl acrylate (309 kg). The first monomer feed was introduced to the reactor at a feed rate of 21.5 kg/min. followed by a 15 minute hold time. The reactor contents were then neutralized by the addition of an aqueous ammonia (3%) solution (191 kg) at a feed rate of 38 kg/min. Next, a second monomer feed containing styrene (210 kg), butyl acrylate (803 kg), 1,6-hexane diol diacrylate (57 kg) and acetoacetoxyethyl methacrylate (38 kg) was added to the reactor contents at a feed rate of 36.9 kg/min. The reactor contents were then held for 15 minutes. A third monomer feed of styrene (850 kg) was then introduced to the reactor at a feed rate of 17 kg/min followed by a final hold period of 60 minutes. Thereafter, a second neutralization step was conducted by addition of an aqueous ammonia (3%) solution (232 kg) to the reactor. The reactor contents were then cooled to about 50° C. and an aqueous solution containing 36 kg of DYTEK A® (1,5-hexane diamine available from E.I. Dupont de Nemours & Co., Wilmington, Del.) and 67 kg water was added over a 10 minute period to the polymeric ingredients in the reactor to form an aqueous polymeric formulation. Finally, 36 kg of a 5% aqueous solution of KATHON® CG preservative was added to the reactor with agitation. The aqueous polymeric formulation was substantially free of grit, slime and gelation so that it easily passed through a 50 micron filter. The resulting polymeric formulation was comprised of polymeric ingredients having a number average particle size in a range of 69–80 nanometers. The formulation had about 38% non-volatiles and a pH of about 9.5.

Films formed with the polymeric formulation readily passed a freeze-thaw stability test (more than 10 cycles) and a cold check stability test ASTM # D12116.02 (more than 20 cycles). Each cycle of the freeze-thaw stability test was conducted by refrigerating the film to about 0° C. overnight and then removing the film and allowing it to warm to room temperature. The film was then visually observed for cracks. No cracks were observed even after 10 cycles for the film derived from the above-described polymeric formulation. In addition, film clarity was rated a 9 on a scale of 0–10 with 10 being the best. The films derived from the polymeric formulation of this invention also showed excellent solvent resistance to ethanol and isopropanol (4–5 on a scale of 0–5 with 5 being best) as well as excellent stain resistance when tested against catsup, mustard, coffee, tea, wine and vinegar.

Other variations and modifications of this invention will be obvious to those skilled in this art. This invention is not to be limited except to set forth in the following claims.

What is claimed is:

1. A single-package aqueous polymeric initial formulation comprising:
   (a) a polymeric ingredient having (i) a latex seed core with a number average particle size in a range from 20 nanometers to about 60 nanometers and a polymerizable monomeric ingredient having both (ii) acid functional pendant moieties and (iii) pendant moieties having the ability to form stable enamine structures by reaction with amines, which contain a divalent group of the structure

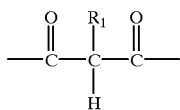

wherein $R_1$ is either H, a $C_1$ to $C_{10}$ alkyl group, or phenyl;

(b) a polyfunctional amine having at least two amine functional moieties;

(c) an effective amount of base to inhibit crosslinking of the polymeric ingredient with the polyfunctional amine; and (d) an evaporable aqueous carrier, wherein the seed core is of a different chemical composition than the polymerizable monomeric ingredient.

2. An aqueous polymeric formulation according to claim 1, wherein said latex seed core is derived from styrene.

3. An aqueous polymeric formulation according to claim 2, wherein said pendant moieties having the ability to form stable enamine structures are derived from a monomeric ingredient represented by the following structure

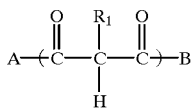

wherein $R_1$ is either H, a $C_1$ to $C_{10}$ alkyl group, or phenyl; wherein A is either:

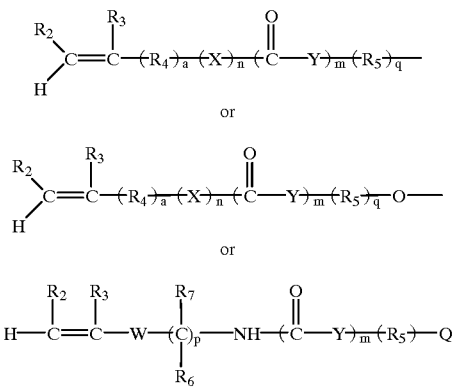

wherein $R_2$ is either H, $C_1$ to $C_{10}$ alkyl, phenyl, substituted phenyl, phenylalkyl, halo, $CO_2CH_3$ or CN;
wherein $R_3$ is either H, $C_1$ to $C_{10}$ alkyl, phenyl, substituted phenyl, phenylalkyl or halo;
wherein $R_4$ is either $C_1$ to $C_{10}$ alkylene, phenylene, or substituted phenylene;
wherein $R_5$ is either alkylene or substituted alkylene;
wherein $R_6$ and $R_7$ are independently either H, $C_1$ to $C_{10}$ alkyl, phenyl, substituted phenyl or phenylalkyl;
wherein any of a, m, n, p and q is either 0 or 1;
wherein each of X and Y is either —NH— or —O—;
wherein W is arylene having 6 to 20 carbon atoms;
wherein Q is O or a single bond;
and wherein B is A, a $C_1$ to $C_{10}$ alkyl group or phenyl, substituted phenyl, or heterocyclic.

4. An aqueous polymeric formulation according to claim 3, wherein said polymeric ingredient has an acid number in a range of from about 30 to about 300.

5. An aqueous polymeric formulation according to claim 4, wherein said polyfunctional amine is a non-polymeric functional amine having a chemical formula weight of less than about 2000 grams per mole.

6. An aqueous polymeric formulation according to claim 5, wherein said base is ammonia or a volatile amine.

7. An aqueous polymeric formulation according to claim 6, wherein said monomeric ingredient is selected from the group consisting of the structures of the formula,

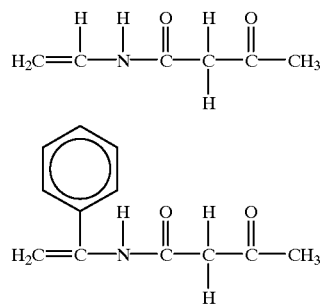

and combinations thereof.

8. An aqueous polymeric formulation according to claim 6, wherein the monomeric ingredient is selected from the group consisting of acetoacetoxyethyl methacrylate, acetoacetoxyethyl acrylate, allyl acetoacetate, vinyl acetoacetate, 3-isopropenyl-α,α-dimethylbenzyl amidoacetoacetate and combinations thereof.

9. An aqueous polymeric formulation according to claim 6, wherein the monomeric ingredient is selected from the group consisting of acetoacetoxyethyl methacrylate, acetoacetoxyethyl acrylate, and combinations thereof.

10. An aqueous polymeric formulation according to claim 1, wherein the acid functional moieties present in the polymeric ingredient are derived from a monomeric ingredient which is an ethylenically-unsaturated carboxylic acid moiety-containing monomer.

11. An aqueous polymeric formulation according to claim 10, wherein the monomeric ingredient is selected from the group consisting of acrylic acid, ethacrylic acid, fumaric acid-monoethyl ester, fumaric acid, itaconic acid, maleic acid, maleic anhydride, methacrylic acid, fumaric acid-monomethyl ester, methyl hydrogen maleate, and combinations thereof.

12. An aqueous polymeric formulation according to claim 3, wherein the acid functional moieties present in the polymeric ingredient are derived from a monomeric ingredient which is an ethylenically-unsaturated carboxylic acid moiety-containing monomer.

13. An aqueous polymeric formulation according to claim 12, wherein the monomeric ingredient is selected from the group consisting of acrylic acid, ethacrylic acid, fumaric acid-monoethyl ester, fumaric acid, itaconic acid, maleic acid, maleic anhydride, methacrylic acid, fumaric acid-monomethyl ester, methyl hydrogen maleate, and combinations thereof.

14. An aqueous polymeric formulation according to claim 5, wherein the non-polymeric polyfunctional amine is selected from the group consisting of 1,5-hexane diamine, hexamethylene diamine, 2-methyl pentamethylene diamine, 1,3-diamino pentane, dodecane diamine, 1,2-diamine, 3-methyl piperidine, isophorone diamine, bis-hexamethylene triamine, diethylene triamine, and combinations thereof.

15. An aqueous polymeric formulation according to claim 6, wherein said monomeric ingredient is acetoacetoxyethyl methacrylate, said non-polymeric functional amine is 1,5-hexane diamine and said acid functional moieties are derived from methacrylic acid.

16. An aqueous polymeric formulation according to claim 15, wherein said polymeric ingredient is further derived from at least one ethylenically unsaturated monomer selected from the group consisting of methyl methacrylate, 2-ethylhexyl acrylate, butyl acrylate and mixtures thereof.

17. An aqueous polymeric formulation according to claim 16, wherein the number average particle size of said latex seed core is in a range from about 20 nanometers to about 40 nanometers.

18. A single-package aqueous polymeric initial formulation comprising:

(a) a first polymeric ingredient having acid functional pendant moieties and a second polymeric ingredient having pendant moieties having the ability to form stable enamine structures by reaction with amines, which contain a divalent group of the structure

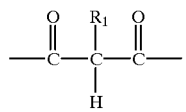

wherein $R_1$ is either H, a $C_1$ to $C_{10}$ alkyl group, or phenyl, wherein both said first and second polymeric ingredients, have a latex seed core with a number average particle size in a range from 20 nanometers to about 60 nanometers, at least one of the polymeric ingredients includes the latex seed core of a different chemical composition than the polymerizable monomeric ingredient;

(b) a polyfunctional amine having at least two amine functional moieties;

(c) an effective amount of base to inhibit crosslinking of the second polymeric ingredient with the polyfunctional amine; and (d) an evaporable aqueous carrier.

19. An aqueous polymeric formulation according to claim 18, wherein said latex seed core is derived from styrene.

20. An aqueous polymeric formulation according to claim 19, wherein said pendant moieties having the ability to form stable enamine structures are derived from a monomeric ingredient represented by the following structure

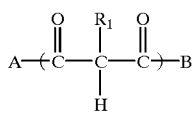

wherein $R_1$ is either H, a $C_1$ to $C_{10}$ alkyl group, or phenyl; wherein A is either:

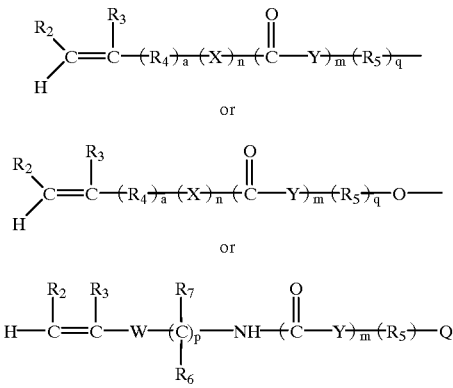

wherein $R_2$ is either H, $C_1$ to $C_{10}$ alkyl, phenyl, substituted phenyl, phenylalkyl, halo, $CO_2CH_3$ or CN;
wherein $R_3$ is either H, $C_1$ to $C_{10}$ alkyl, phenyl, substituted phenyl, phenylalkyl or halo;
wherein $R_4$ is either $C_1$ to $C_{10}$ alkylene, phenylene, or substituted phenylene;
wherein $R_5$ is either alkylene or substituted alkylene;
wherein $R_6$ and $R_7$ are independently either H, $C_1$ to $C_{10}$ alkyl, phenyl, substituted phenyl or phenylalkyl;
wherein any of a, m, n, p and q is either 0 or 1;
wherein each of X and Y is either —NH— or —O—;
wherein W is arylene having 6 to 20 carbon atoms;
wherein Q is O or a single bond;
and wherein B is A, a $C_1$ to $C_{10}$ alkyl group or phenyl, substituted phenyl, or heterocyclic.

21. An aqueous polymeric formulation according to claim 20, wherein said first polymeric ingredient has an acid number in a range of from about 30 to about 300.

22. An aqueous polymeric formulation according to claim 21, wherein said polyfunctional amine is a non-polymeric functional amine having a chemical formula weight of less than about 2000 grams per mole.

23. An aqueous polymeric formulation according to claim 22, wherein said base is ammonia or a volatile amine.

24. An aqueous polymeric formulation according to claim 20, wherein the monomeric ingredient is selected from the group consisting of acetoacetoxyethyl methacrylate, acetoacetoxyethyl acrylate, allyl acetoacetate, vinyl acetoacetate, 3-isopropenyl-α,α-dimethylbenzyl amidoacetoacetate and combinations thereof.

25. An aqueous polymeric formulation according to claim 20, wherein the acid functional moieties present in the first polymeric ingredient are derived from a monomeric ingredient which is an ethylenically-unsaturated carboxylic acid moiety-containing monomer.

26. An aqueous polymeric formulation according to claim 25, wherein the monomeric ingredient is selected from the group consisting of acrylic acid, ethacrylic acid, fumaric acid-monoethyl ester, fumaric acid, itaconic acid, maleic acid, maleic anhydride, methacrylic acid, fumaric acid-monomethyl ester, methyl hydrogen maleate, and combinations thereof.

27. An aqueous polymeric formulation according to claim 22, wherein the non-polymeric polyfunctional amine is selected from the group consisting of 1,5-hexane diamine, hexamethylene diamine, 2-methyl pentamethylene diamine, 1,3-diamino pentane, dodecane diamine, 1,2-diamine, 3-methyl piperidine, isophorone diamine, bis-hexamethylene triamine, diethylene triamine, and combinations thereof.

28. An emulsion addition polymerization process for preparing a single-package aqueous polymeric formulation, said process comprising the steps of:

(a) preparing latex seed particles having a number average particle size in a range from about 20 to about 60 nanometers in a reactor;

(b) introducing (i) the latex seed particles, (ii) an initiator, (iii) a surfactant and (iv) an evaporable aqueous carrier, to an emulsion polymerization reaction zone separate from the reactor;

(c) introducing emulsion polymerizable ingredients to the emulsion polymerization reaction zone, said emulsion polymerizable ingredients comprising at least one monomer having pendant moieties having the ability to form stable enamine structures by reaction with amines, which contain a divalent group of the structure

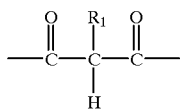

wherein $R_1$ is either H, a $C_1$ to $C_{10}$ alkyl group, or phenyl, and at least one acid functional monomer, and polymerizing said emulsion polymerizable ingredients to form a polymeric ingredient;

(d) adding an effective amount of base to the aqueous carrier containing said polymeric ingredient to inhibit crosslinking of the polymeric ingredient with a polyfunctional amine while both are present in the aqueous carrier; and (e) adding a polyfunctional amine having at least two amine functional moieties to the evaporable aqueous carrier containing said polymeric ingredient.

29. An addition polymerization process according to claim 28, wherein said latex seed particles are derived from styrene.

30. An addition polymerization process according to claim 29, wherein said acetoacetoxy functional monomer is represented by the following structure,

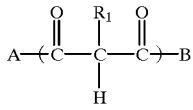

wherein $R_1$ is either H, a $C_1$ to $C_{10}$ alkyl group, or phenyl; wherein A is either:

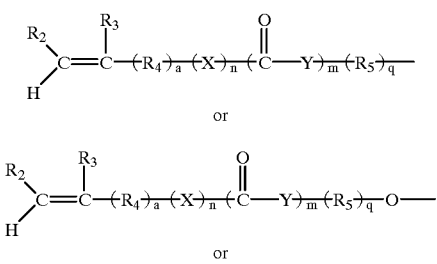

or

-continued

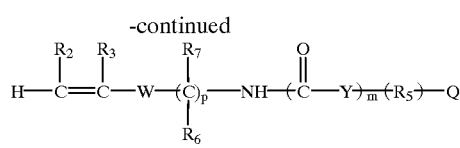

wherein $R_2$ is either H, $C_1$ to $C_{10}$ alkyl, phenyl, substituted phenyl, phenylalkyl, halo, $CO_2CH_3$ or CN;

wherein $R_3$ is either H, $C_1$ to $C_{10}$ alkyl, phenyl, substituted phenyl, phenylalkyl or halo;

wherein $R_4$ is either $C_1$ to $C_{10}$ alkylene, phenylene, or substituted phenylene;

wherein $R_5$ is either alkylene or substituted alkylene;

wherein $R_6$ and $R_7$ are independently either H, $C_1$ to $C_{10}$ alkyl, phenyl, substituted phenyl or phenylalkyl;

wherein any of a, m, n, p and q is either 0 or 1;

wherein each of X and Y is either —NH— or —O—;

wherein W is arylene having 6 to 20 carbon atoms;

wherein Q is O or a single bond;

and wherein B is A, a $C_1$ to $C_{10}$ alkyl group or phenyl, substituted phenyl, or heterocyclic.

31. An addition polymerization process according to claim 30, wherein said acid functional monomer is an ethylenically unsaturated carboxylic acid moiety containing monomer.

32. An addition polymerization process according to claim 31, wherein the polyfunctional amine is a non-polymeric functional amine having a chemical formula weight of less than about 2000 grams per mole.

33. An addition polymerization process according to claim 32, wherein said base is ammonia or a volatile amine.

34. An addition polymerization process according to claim 33, wherein the acetoacetoxy functional monomer is selected from the group consisting of acetoacetoxyethyl methacrylate, acetoacetoxyethyl acrylate, allyl acetoacetate, vinyl acetoacetate, 3-isopropenyl-α,α-dimethylbenzyl amidoacetoacetate and combinations thereof.

35. An addition polymerization process according to claim 34, wherein said acid functional monomer is selected from the group consisting of acrylic acid, ethacrylic acid, fumaric acid-monoethyl ester, fumaric acid, itaconic acid, maleic acid, maleic anhydride, methacrylic acid, fumaric acid-monomethyl ester, methyl hydrogen maleate, and combinations thereof.

36. An addition polymerization process according to claim 35, wherein the non-polymeric polyfunctional amine is selected from the group consisting of 1,5-hexane diamine, hexamethylene diamine, 2-methyl pentamethylene diamine, 1,3-diamino pentane, dodecane diamine, 1,2-diamine, 3-methyl piperidine, isophorone diamine, bis-hexamethylene triamine, diethylene triamine, and combinations thereof.

37. An addition polymerization process according to claim 36, wherein said emulsion polymerizable ingredients further comprise a crosslinking agent.

38. An addition polymerization process according to claim 37, wherein said step of introducing the emulsion polymerizable ingredients to the emulsion polymerization reactor zone is conducted in a plurality of polymerization stages.

39. A multi-stage emulsion addition polymerization process for preparing a single-package aqueous polymeric formulation, said process comprising the steps of (a) preparing latex seed particles having a number average particle size in a range from about 20 to about 60 nanometers in a reactor;

(b) introducing (i) the latex seed particles, (ii) an initiator, (iii) a surfactant and (iv) an evaporable aqueous carrier, to an emulsion polymerization reaction zone separate from the reactor;

(c) introducing (i) first stage emulsion polymerizable ingredients to the emulsion polymerization reaction zone under emulsion polymerization conditions to form a first stage polymeric ingredient and (ii) subsequently introducing second stage emulsion polymerizable ingredient to the emulsion polymerization reaction zone under emulsion polymerization conditions to form a second stage polymeric ingredient, wherein at least one of the first stage and second stage emulsion polymerizable ingredients comprises independently (i) a monomer having pendant moieties having the ability to form stable enamine structures by reaction with amines, which contain a divalent group of the structure

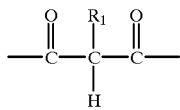

wherein $R_1$ is either H, a $C_1$ to $C_{10}$ alkyl group, or phenyl, and at least one acid functional monomer, and (ii) an acid functional monomer;

(d) optionally introducing third stage emulsion polymerizable ingredients to the emulsion polymerization zone under emulsion polymerization conditions to form a third stage polymeric ingredient;

(e) adding an effective amount of base to the aqueous carrier ingredient to inhibit crosslinking of the second stage or third stage polymeric ingredient with a polyfunctional amine while both are present in the aqueous carrier; and (f) adding a polyfunctional amine having at least two amine functional moieties to the evaporable aqueous carrier containing said second stage or third stage polymeric ingredient.

40. A multi-stage emulsion addition polymerization process according to claim 39, wherein said latex seed particles are derived from styrene.

41. A multi-stage emulsion addition polymerization process according to claim 40, wherein the first stage emulsion polymerizable ingredients are comprised of the monomer having pendant moieties having the ability to form stable enamine structures by reaction with amines and the acid functional monomer.

42. A multi-stage emulsion addition polymerization process according to claim 41, wherein said monomer having pendant moieties having the ability to form stable enamine structures by reaction with amines is represented by the following structure:

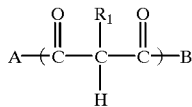

wherein $R_1$ is either H, a $C_1$ to $C_{10}$ alkyl group, or phenyl; wherein A is either:

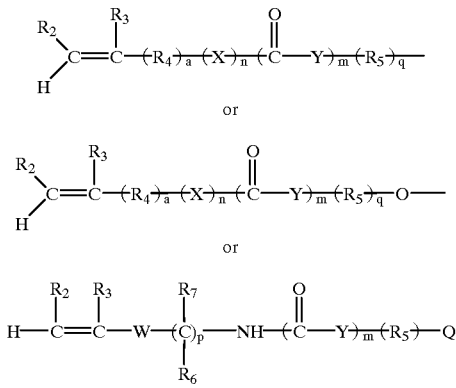

wherein $R_2$ is either H, $C_1$ to $C_{10}$ alkyl, phenyl, substituted phenyl, phenylalkyl, halo, $CO_2CH_3$ or CN;

wherein $R_3$ is either H, $C_1$ to $C_{10}$ alkyl, phenyl, substituted phenyl, phenylalkyl or halo;

wherein $R_4$ is either $C_1$ to $C_{10}$ alkylene, phenylene, or substituted phenylene;

wherein $R_5$ is either alkylene or substituted alkylene;

wherein $R_6$ and $R_7$ are independently either H, $C_1$ to $C_{10}$ alkyl, phenyl, substituted phenyl or phenylalkyl;

wherein any of a, m, n, p and q is either 0 or 1;

wherein each of X and Y is either —NH— or —O—;

wherein W is arylene having 6 to 20 carbon atoms;

wherein Q is O or a single bond;

and wherein B is A, a $C_1$ to $C_{10}$ alkyl group or phenyl, substituted phenyl, or heterocyclic.

43. A multi-stage emulsion addition polymerization process according to claim 42, wherein the acid functional monomer is an ethylenically unsaturated carboxylic acid moiety-containing monomer.

44. A multi-stage emulsion addition polymerization process according to claim 43, wherein the acid functional monomer is selected from the group consisting of acrylic acid, ethacrylic acid, fumaric acid-monoethyl ester, fumaric acid, itaconic acid, maleic acid, maleic anhydride, methacrylic acid, fumaric acid-monomethyl ester, methyl hydrogen maleate, and combinations thereof.

45. A multi-stage emulsion addition polymerization process according to claim 44, wherein said polyfunctional amine is a non-polymeric functional amine having a chemical formula weight of less than about 2000 grams per mole.

46. A multi-stage emulsion addition polymerization process according to claim 45, wherein said base is ammonia or a volatile amine.

47. A multi-stage emulsion addition polymerization process according to claim 46, wherein the second stage emulsion polymerizable ingredients comprise at least one ethylenically unsaturated monomer.

48. A multi-stage emulsion addition polymerization process according to claim 47, wherein the second stage emulsion polymerizable ingredients further comprise a crosslinking agent.

49. A multi-stage emulsion addition polymerization process according to claim 48, wherein a third stage polymeric ingredient is formed by the introduction of an ethylenically unsaturated monomer.

50. A multi-stage emulsion addition polymerization process according to claim 49, wherein said monomeric ingredient is selected from the group consisting of the structures of the formula,

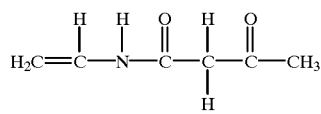

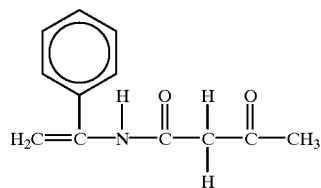

and combinations thereof.

51. A multi-stage emulsion addition polymerization process according to claim 49, wherein the monomeric ingredient is selected from the group consisting of acetoacetoxyethyl methacrylate, acetoacetoxyethyl acrylate, allyl acetoacetate, vinyl acetoacetate, 3-isopropenyl-α,α-dimethylbenzyl amidoacetoacetate and combinations thereof.

52. A multi-stage emulsion addition polymerization process according to claim 51, wherein the non-polymeric polyfunctional amine is selected from the group consisting of 1,5-hexane diamine, hexamethylene diamine, 2-methyl pentamethylene diamine, 1,3-diamino pentane, dodecane diamine, 1,2-diamine, 3-methyl piperidine, isophorone diamine, bis-hexamethylene triamine, diethylene triamine, and combinations thereof.

53. A multi-stage emulsion addition polymerization process according to claim 52, wherein the third stage polymeric ingredients comprise styrene.

* * * * *